United States Patent [19]
Kagiya et al.

[11] 3,894,928
[45] July 15, 1975

[54] RADIATION PROCESS FOR THE CROSSLINKING OF POLYETHYLENE WITH THE USE OF ACRYLIC AND ACETYLENIC COMPOUNDS

[75] Inventors: Tsutomu Kagiya, Kyoto; Miyuki Hagiwara, Maebashi; Tsukasa Kagiya; Masayoshi Sohara, both of Takasaki, all of Japan

[73] Assignee: Kishimoto Sangyo Co., Ltd., Tokyo, Japan

[22] Filed: Apr. 26, 1973

[21] Appl. No.: 354,810

[30] Foreign Application Priority Data
May 1, 1972  Japan.............................. 47-42608

[52] U.S. Cl.... 204/159.17; 204/154.16; 260/878 R; 260/884; 260/885; 260/897 B; 260/897 C
[51] Int. Cl.............................. C08d 1/00; C08f 1/16
[58] Field of Search..... 204/159.15, 159.16, 159.17; 260/878

[56] References Cited
UNITED STATES PATENTS
3,414,498   12/1968   Shinohara et al................ 204/160.1

Primary Examiner—John C. Bleutge
Assistant Examiner—Richard B. Turer
Attorney, Agent, or Firm—Armstrong, Nikaido, & Wegner

[57] ABSTRACT

A method is provided for the cross-linking reformation of an ethylenic polymer which comprises subjecting said ethylenic polymer to ionizing radiation in the presence of a. an acrylic monomer capable of being cross-linked with said ethylenic polymer; and
b. an acetylenic compound of the formula $$(CH \equiv C)_n R$$

wherein R is an n-valent organic radical rendering said acetylenic compound capable of being blended with said ethylenic polymer at an elevated temperature.

4 Claims, No Drawings

RADIATION PROCESS FOR THE CROSSLINKING OF POLYETHYLENE WITH THE USE OF ACRYLIC AND ACETYLENIC COMPOUNDS

BACKGROUND OF THE INVENTION

It has generally been observed that efficiency of high-energy radiation in the crosslinking polymers is rather low.

It is an object of the present invention to provide a method to readily form crosslinks in the molecules of ethylenic polymers.

It is further an object of the invention to readily obtain the ethylenic polymers and derivatives thereof, having many croslinks in their molecules.

A still further object is to provide a method for readily yielding ethylenic polymers which are useful for the making of articles, such as films, sheets, coatings and molds, having excellent mechanical strength, and heat and chemical resistance.

SUMMARY OF THE INVENTION

Through the present invention there are provided additives which are effective to accelerate the radiation crosslinking. The ethylenic polymers are exposed to ionizing radiation in the presence of the new accelerators. In some cases, the accelerators are added to the polymers on the molding process and then expose the composite to radiation for crosslinking.

More specifically, a method is provided for the crosslinking reformation of an ethylenic polymer which comprises subjecting said ethylenic polymer to ionizing radiation in the presence of a. an acrylic monomer capable of being cross-linked with said ethylenic polymer; and b. an acetylenic compound of the formula $$(CH \equiv C)_n R$$

wherein R is an n-valent organic radical rendering said acetylenic compound capable of being blended with said ethylenic polymer at an elevated temperature.

DETAILED DESCRIPTION OF THE INVENTION

Generally, the objects of the present invention are accomplished by exposing the polymeric articles to ionizing radiation in the presence of a small amount of acrylic monomer and the compound having at least one $CH \equiv C$—group in the molecule.

In accordance with the invention it has been unexpectedly discovered that when an acrylic monomer is polymerized in the presence of a small amount of acetylenic compounds, many crosslinks are formed among the polymers produced (ref. J. Polymer Sci., B8, 155–158 (1970) ). When the crosslinking polymerization of acrylic monomers is carried out in the matrix of a polyethylene film with ionizing radiation, the film, by efficient crosslinking in polyethylene molecules, changes in character to become very resistant to heat; it is also insoluble in organic solvent after a small degree of radiation. The above effect is believed due to an efficient graft of the crosslinked copolymers of the acrylic monomers and acetylenic compounds of polyethylene molecules.

As examples of acrylic monomers to be added to polyethylene according to the present invention are acrylic acid, methacrylic acid; lower alkyl acrylates such as methyl acrylate, ethyl acrylate, n-propyl acrylate, iso-propyl acrylate, n-butyl acrylate; lower alkyl methacrylates such as methyl methacrylate; cyclic alkyl acrylates such as cyclohexyl acrylate; aryl acrylate such as those of the phenol series, notably phenyl acrylate, monocyclic acrylates containing an oxygen or nitrogen heteroatom; nitrogen $\alpha$- or $\beta$- halo(lower alkyl)acrylates; acrylonitrile and acryl amide.

Ester derivatives of polyhydric alcohols have been used as the accelerators for the crosslinking polymerization of acrylic monomers and for the crosslinking of various kinds of polymeric materials. These polyfunctional acrylic monomers are also useful in the present invention. The efficiency of crosslinking is greatly improved when they are used with another component having $CH \equiv C$—group according to the present invention. As ester derivatives from polyhydric alcohol may be mentioned dimethylene diacrylate, dimethylene dimethacrylate, tetramethylene diacrylate and hexamethylene diacrylate.

The compounds having $CH \equiv C$—group for use in the process of the present invention may be represented by the general formula $(CH \equiv C)_n R$, wherein R is a n-valent organic radical capable of rendering the monomeric $(CH \equiv C)_n R$ liquid of relatively high boiling temperature or a solid of relatively high melting temperature in order to be blended with ethylenic polymer at elevated temperature. Acetylene and its hydrocarbon derivatives such as methyl acetylene are also useful. However, these gaseous compounds are to be avoided in the present process because of the technical difficulty in using such inflamable gases, the industrial processes of the polymeric materials and especially in the radiation processes.

As representative and useful compounds of the formula $CH \equiv C)_n R$ may be mentioned for $n=1$, propargyl alcohol, propiolic acid, propargyl amine, propargyl acetate, propargyl benzoate, methyl propiolate, isopropyl propiolate, methyl propalgyl amine, dimethyl propalgyl amine. As preferred compounds are acrylic propargyl acrylate and propargyl methacrylate. As compounds where $n=2$ may be mentioned propargyl propiolate, dipropargyl amine, dimethylene dipropiolate, tetramethylene dipropiolate, hexamethylene dipropiolate, dipropargyl phthalate, dipropargyl isophthalate, dipropargyl terephthalate, dipropargyl maleate, dipropargyl itaconate. For $n=3$ may be mentioned tripropargyl amine, tripropargyl trimellitate.

The optimum amount of these additives used varies depending on the kinds of acrylic monomers and $(CH \equiv C)_n R$, and the kind of their combinations. A preferred range is from 0.1–5.0 wt%, still more preferably 0.5–2.5 wt% based on the ethylenic polymers: when less, the effect of the additives would not be so distinguishable, whereas when more, the chemical nature of the original polymer would be greatly altered.

The ethylenic polymers used in the present invention are polyethylene; its halogented derivatives such as chlorinated polyethylene; random, graft or block copolymers of ethylene and propylene, vinyl acetate, vinyl chloride, acrylic acid, methacrylic acid, acrylonitrile and butadiene; further, the mixture of these ethylenic polymers with vinyl polymers such as polypropylene, polystyrene, polyvinyl chloride, polyacrylic acid, polymethacrylic acid, polymethyl acrylate, polymethyl methacrylate, polyacrylonitrile and polybutadiene.

In the carrying out of the present invention, the ionizing radiation may suitably be $\gamma$-rays, X-rays, $\alpha$-rays and β-rays usually at a dose rate of from $10^2$ to $10^6$ roentgens per hour. An accelerated electron beam may also be used for the irradiation purpose, in which case the dose rate applied can be so high as $10^6$–$10^7$ roentgens per second. The irradiation may usually be carried out in open air at room temperature. However, when the air atmosphere is replaced by carbon dioxide, nitrogen, helium, argon or other inert gas, thereby it would be carried out more effectively.

The following examples serve to illustrate the invention:

EXAMPLE 1

A commercial grade polyethylene film (0.2 mm thick, molecular weight = 70,000) was placed in a glass ampule, and the mixture of methyl methacrylate and propiolic acid (1:1-weight ratio) was introduced up to 2.5 parts by weight of 100 parts of the film sample. The air in the ampule was next displaced with nitrogen. Then, after standing at room temperature for some hours, the film was exposed to $^{60}Co$, γ-rays in a vapor phase of the additives. On the other hand, as a control a similar film, in nitrogen, in the vapour phase of methyl methacrylate or propiolic acid, was exposed to γ-rays.

After these treatments, the film was immersed in the boiling xylene for 20 hours and next in methanol for 4 hours, and dried in vacuum for 20 hours at room temperature. The insoluble gel fraction was determined by measuring the weight percent of the residue. The effect of the irradiation of γ-rays of 2.5 Mrads on the gel fraction was shown in Table 1.

Table 1.

| Atmosphere | Gel-fraction (wt%) |
| --- | --- |
| Methyl methacrylate Propiolic acid | 60.1 |
| Methyl methacrylate | 2.9 |
| Propiolic acid | 22.6 |
| Nitrogen | 1.2 |

EXAMPLE 2

When methyl methacrylate in Example 1 was replaced by methyl acrylate, the results are as follows:

Table 2.

| Atmosphere | Gel-fraction (wt%) |
| --- | --- |
| Methyl acrylate Propiolic acid | 50.0 |
| Methyl acrylate | 2.2 |
| Propiolic acid | 22.6 |
| Nitrogen | 1.2 |

EXAMPLE 3

When methyl methacrylate in Example 1 was replaced by acrylic acid, the results are as follows:

Table 3.

| Atmosphere | Gel-fraction (wt%) |
| --- | --- |
| Acrylic Acid Propiolic acid | 55.5 |
| Acrylic acid | 27.3 |
| Propiolic acid | 22.6 |
| Nitrogen | 1.2 |

EXAMPLE 4

When dimethylene dimethylmethacrylate was used instead of methylmethacrylate, the results are as follows:

Table 4.

| Atmosphere | Gel-fraction (wt%) |
| --- | --- |
| Dimethylene dimethacrylate Propiolic acid | 50.6 |
| Dimethylene dimethacrylate | 5.6 |
| Propiolic acid | 22.6 |
| Nitrogen | 1.2 |

EXAMPLE 5

A commercial grade high density polyethylene (100 parts) known under the registered trademark "Hizex 5000H" was mixed with hexamethylene diacrylate (2.0 parts by weight of polyethylene) and dipropargyl maleate (1.0 parts) on the hot roller for 10 minutes at 150°C, and molded into a sheet of 1.0 mm thick. The sheet was then exposed at room temperature to γ-rays from $^{60}Co$ in nitrogen or in air atmosphere. On the other hand, as a control sheets mixed with hexamethylene diacrylate (3.0 parts), and with no additives was irradiated under the same conditions.

Table 5.

| Additives | | Air atmosphere Gel fraction (wt%) | |
| --- | --- | --- | --- |
| | | 2.5 Mrads | 5.0 Mrads |
| Hexamethylene diacrylate | (2 parts) | | |
| Dipropargyl maleate | (1 part) | 43.0 | 62.3 |
| Hexamethylene diacrylate | (3 parts) | 31.0 | 37.0 |
| No additives | | 0.6 | 19.3 |

Table 6.

| Additives | | Nitrogen atmosphere Gel fraction (wt%) | |
| --- | --- | --- | --- |
| | | 2.5 Mrads | 5.0 Mrads |
| Hexamethylene diacrylate | (2 parts) | | |
| Dipropargyl diacrylate | (1 part) | 59.5 | 73.0 |
| Hexamethylene diacrylate | (3 parts) | 29.0 | 49.5 |
| No additives | | 0.7 | 26.0 |

EXAMPLE 6

When the combination of the additives in Example 7 are changed into hexamethylene diacrylate: Dipropargyl terephthalate, the results were as follows:

Table 7.

| Additives | | Air atmosphere Gel fraction (wt%) | |
| --- | --- | --- | --- |
| | | 1.0 Mrads | 2.5 Mrads |
| Hexamethylene diacrylate | (2 parts) | 44.0 | 58.0 |
| Dipropargyl terephthalate | (1 part) | | |
| No additives | | 0.1 | 0.6 |

Table 8.

| Additives | | Nitrogen atmosphere Gel fraction (wt%) | |
|---|---|---|---|
| | | 1.0 Mrads | 2.5 Mrads |
| Hexamethylene diacrylate | (2 parts) | 43.2 | 52.0 |
| Dipropargyl terephthalate | (1 part) | | |
| No additives | | 0.1 | 0.7 |

EXAMPLE 7

When the combination of the additives in Example 1 are changed into hexamethylene diacrylate — hexamethylene dipropiolate, the results were as follows:

Table 9.

| Additives | Air atmosphere Gel - fraction (wt%) | |
|---|---|---|
| | 2.5 Mrads | 5.0 Mrads |
| Hexamethylene diacrylate Hexamethylene dipropiolate | 55.2 | 60.4 |
| No additives | 0.6 | 19.3 |

Table 10.

| Additives | Nitrogen atmosphere Gel - fraction (wt%) | |
|---|---|---|
| | 2.5 Mrads | 5.0 Mrads |
| Hexamethylene diacrylate Hexamethylene dipropiolate | 62.8 | 70.4 |
| No additives | 0.7 | 26.0 |

EXAMPLE 8

A commercial grade low density polyethylene (100 parts) was made partially incombustible by blended with chlorinated polyethylene (10 parts) and antimonous trioxide (3 parts). The composite (100 parts) was next mixed with hexamethylene diacrylate (1 part) and propargyl maleate (1 part), and molded into a sheet of 1.0 mm thick. The sheet was then exposed to γ-rays from $^{60}$Co in nitrogen atmosphere.

The results are given in Table 11 below.

Table 11.

| Additives | Gel - fraction | | |
|---|---|---|---|
| | 1.0 | 2.5 | 5.0 Mrads |
| Hexamethylene diacrylate Dipropargyl maleate | 48.0 | 60.0 | 69.0 |
| No additives | 7.5 | 9.5 | 30.4 |

EXAMPLE 9

A polyethylene compound having self distinguishing property, which was made of low density polyethylene (25% by weight), chlorinated polyethylene (50%), antimouous trioxide (15%), organic halide (10%), was treated by a similar procedure described in Example 8. The results are given in Table 12 below.

Table 12.

| Additives | Gel - fraction | |
|---|---|---|
| | 5.0 Mrads | 10.0 |
| Hexamethylene diacrylate Dipropargyl maleate | 58.6 | 67.0 |
| No additives | 5.1 | 10.2 |

EXAMPLE 10

A commercial grade low density polyethylene was irradiated in butadiene atmosphere at room temperature to a dose of 0.5 Mrads. The irradiated polyethylene, which contains about 4 wt% of the grafted butadiene — polymer chains, was then moulded into a film of 0.2 mm thick.

The film was next crosslinked with 2.5 Mrads of the γ-rays from $^{60}$Co by a similar procedure described in Example 1. The results are given in Table 13 below.

Table 13.

| Atmosphere | Gel - fraction (wt%) |
|---|---|
| Methyl methacrylate | 74.8 |
| Propiolic Acid | |
| Methyl methacrylate | 21.0 |
| Propiolic Acid | 28.6 |
| Nitrogen | 2.2 |

EXAMPLE 11

Mechanical properties of the crosslinked polyethylene obtained by a procedure described in Example 5 were as follows:

Table 14.

| Dose | Air atmosphere | | | |
| | Tensile strength (kg/cm²) | | Elongation (%) | |
|---|---|---|---|---|
| (Mrads) | HGA-DPM | No-additive | HGA-DPM | No-additive |
| 0 | 261 | 248 | 875 | 580 |
| 2.5 | 268 | 258 | 725 | 385 |
| 5.0 | 286 | 274 | 642 | 210 |

Additives:  HGA = Hexamethylene diacrylate
CPM = Dipropargyl Maleate

It is clear from the above table that the products of this process are characterized by improved elongation at breaking point.

Thus, when with no additives, the elongation decreases with increase in the radiation dose, where as with use of HGA-DPM, elongation was maintained around that of the original polymer.

These facts mean the products maintain a desirable stiffness as resinic materials even after the radiation treatment.

The polymeric products produced in accordance with the invention find a wide range of uses, including use in structural installations such as sheeting, as well as use as gear parts and in other molded products.

What we claim is:

1. A method for the cross-linking reformation of a polymer of ethylene selected from the group consisting of polyethylene and halogenated polyethylene which comprises subjecting said polymer to ionizing radiation in the presence of
   a. 0.1 to 5.0% by weight based upon said polymer of an acrylic monomer capable of being cross-linked with said polymer, said acrylic monomer being a member selected from the group consisting of acrylic acid, methacrylic acid, methyl acrylate, ethyl acrylate, n-propyl acrylate, iso-propyl acrylate, n-butyl acrylate, methyl methacrylate, cyclohexyl acrylate, phenyl acrylate, oxy-, nitro- and halophenyl acrylates, α- or β-halo (lower alkyl)acrylates, dimethylene diacrylate, dimethylene dimethacrylate, tetramethylene diacrylate and hexamethylene diacrylate; and
   b. 0.1 to 5.0% by weight based upon said polymer of an acetylenic compound capable of being blended with said polymer at an elevated temperature and being a member of the group consisting of propargyl alcohol, propiolic acid, propargyl acrylate, propargyl methacrylates, propargyl propiolate, dipropargyl amine, dimethylene dipropiolate, tetramethylene dipropiolate, hexamethylene dipropiolate, dipropargyl phthalate, dipropargyl iso-phthalate, dipropargyl terephthalate, dipropargyl maleate, dipropargyl itaconate, tripropargyl amine and tripropargyl trimellitate.

2. The method of claim 1 wherein the ethylene polymer is polyethylene.

3. The method of claim 1 wherein the polymer of ethylene is polyethylene and said polyethylene is subjected to ionizing radiation in the presence of
   a. hexamethylene diacrylate; and
   b. dipropargyl maleate.

4. The method of claim 1 wherein α-, β- or γ-rays or accelerated electron beam is employed for the ionizing radiation.

* * * * *

UNITED STATES PATENT OFFICE
CERTIFICATE OF CORRECTION

Patent No. 3,894,928   Dated July 15, 1975

Inventor(s) Tsutomu Kagiya et al

It is certified that error appears in the above-identified patent and that said Letters Patent are hereby corrected as shown below:

Col. 1, line 14, change "croslinks" to --crosslinks--

Col. 6, line 55, change "CPM" to --DPM--

Signed and Sealed this twenty-first Day of October 1975

[SEAL]

Attest:

RUTH C. MASON
Attesting Officer

C. MARSHALL DANN
Commissioner of Patents and Trademarks